United States Patent Office 3,475,434
Patented Oct. 28, 1969

3,475,434
N - PERFLUOROALKANOYLAMINO- AND N - PERFLUOROALKANOYLAMINOALKYL ACRYLAMIDES
Martin Knell, Ossining, N.Y., assignor to Geigy Chemical Corporation, Ardsley, N.Y., a corporation of Delaware
No Drawing. Filed Aug. 22, 1966, Ser. No. 573,840
Int. Cl. C07d 51/70, 103/34
U.S. Cl. 260—268
7 Claims

ABSTRACT OF THE DISCLOSURE

Polymers of compounds represented by the formula:

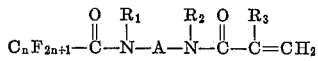

wherein $n$ is a whole number of from 1 to 18, A is —$(CH_2)_m$—, $m$ being from 0 to 4, $R_1$ and $R_2$, independently, are each hydrogen or alkyl of from 1 to 16 carbon atoms; or when taken together, $R_1$ and $R_2$ are —$CH_2CH_2$— when A is —$CH_2CH_2$—, and $R_3$ is hydrogen or methyl, are useful in providing oil- and water-repellent finishes especially for textiles as well as various other substrates. A preferred compound exemplified is N-perfluorooctanoyl-N'-methacryloylhydrazine.

CROSS REFERENCE TO RELATED APPLICATION

Application Ser. No. 573,839, filed Aug. 22, 1966, now U.S. Patent 3,428,709.

This invention relates to fluorine-containing monomers useful to prepare polymers with soil repellent properties. More particularly, it relates to N-perfluoroalkanoylamino- and N-perfluoroanoylaminoalkyl-acrylamides and methacrylamides. The new monomers provide polymers with oil- and water-repellent properties useful to treat materials such as textiles, paper, leather, painted wooden and metallic surfaces, and the like.

The perfluorinated compounds contemplated by the instant invention are those of the formula:

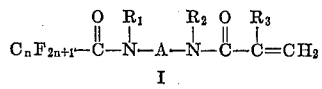

I wherein:

$n$ is a whole number of from 1 to 18;
A is —$(CH_2)_m$—, $m$ being from 0 to 4;
$R_1$ and $R_2$, independently, are each hydrogen or alkyl of from 1 to 6 carbon atoms; or
when taken together, $R_1$ and $R_2$ are —$CH_2CH_2$—
when A is —$CH_2CH_2$—, and
$R_3$ is hydrogen or methyl.

The $C_nF_{2n+1}$ radical may be straight or branched chain. Although $n$ can be from 1 to 18, it is preferred for the best balance of properties and economy to have values of $n$ of from about 7 to about 15.

Especially useful as embodiments of this invention are the compounds, N-perfluorooctanoyl-N'-methacryloylhydrazine, a compound of the above formula in which the straight chain $C_nF_{2n+1}$ radical has a value for $n$ of 7, $m$ is 0, $R_1$ and $R_2$, are hydrogen and $R_3$ is methyl; N-perfluorooctanoyl - N' - methacryloyl piperazine, a compound of the above formula $n$ is 7, $m$ is 2, $R_1$ and $R_2$, taken together, and A are —$CH_2CH_2$— and $R_3$ is methyl; N - perfluorooctanoyl - N' - methyl - N' - methacryloylhydrazine, a compound of the above formula wherein $n$ is 7, $R_1$ is hydrogen, $m$ is 0, and $R_2$ and $R_3$ are methyl; N-perfluorooctanoyl-N'-acryloylhydrazine, a compound of the above formula wherein $n$ is 7, $m$ is 0, and $R_1$, $R_2$ and $R_3$ are hydrogen; N-perfluorooctanoyl-N'-acryloylhydra-zine, a compound of the above formula wherein $n$ is 7, $m$ is 0, $R_1$ and $R_3$ are hydrogen and $R_2$ is methyl; and N-perfluorooctanoyl - N,N' - dimethyl - N' - methacryloylhydrazine, a compound of the above formula wherein $n$ is 7, $m$ is 0, and $R_1$ and $R_3$ are hydrogen and $R_2$ is methyl; and N - perfluorooctanoyl - N,N' - dimethyl-N'-methacryloyl hydrazine, a compound of the above formula wherein $n$ is 7, $m$ is 0 and $R_1$, $R_2$ and $R_3$ are methyl.

Polymers obtained from the new monomers are characterized by excellent resistance to hydrolysis. This provides substantial advantage to their use as fabric finishes, when compared to finishes previously used for the purpose of soil repellency. Fabrics finished with polymers made from the instant monomers retain their soil-repellent properties after repeated washings. They are especially useful in fabric finishes where soil redeposition is a problem. They have, in addition, markedly superior light-fastness and color fastness. They are resistant to removal in dry cleaning operations.

The N-perfluoroalkanoylamino-and N-perfluoroalkanoylaminoalkyl-acrylamides and -methocrylamides of this invention form copolymers with many monomers containing an ethylenic linkage. Illustrative of such co-monomers are butadiene, chloroprene, 1,1,2-trifluoro-1,3-butadiene, octyl acrylate, dodecyl methacrylate, vinyl chloride, and the like. Especially useful to form soil-repellent finishes are copolymers of N-perfluorooctanoyl-N'-methacryloylhydrazine with octyl methacrylate.

The new perfluorinated compounds can be prepared from readily available materials according to the reaction outlined in the following sequence:

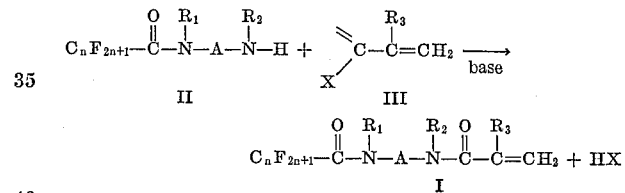

wherein $n$, A, $R_1$, $R_2$ and $R_3$ are as above defined and X is halogen, preferably chlorine or bromine. The term "base" contemplates a reagent which promotes condensation by binding the elements of hydrogen halide eliminated as a byproduct. Pyridine, quinoline and triethylamine are especially useful bases.

The starting materials are readily available or can be prepared by techniques readily within the capabiilties of those skilled in the art. N-aminoalkyl perfluoroalkylamides of Formula II can be prepared, for example, by treating an appropriate alkyl perfluoroalkylcarboxylate with a hydrazine derivative or a diamino derivative according to the following sequence:

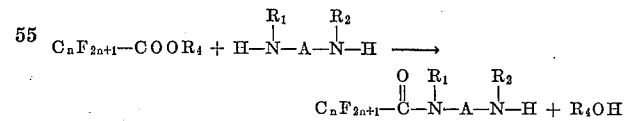

wherein $R_4$ is alkyl and $n$, A, $R_1$ and $R_2$ are as hereinabove defined. The reaction is carried out simply by mixing the ester with a molar equivalent or more of the diamino derivative. The use of an excess of the diamino derivative has a tendency to reduce the amount of diamide formed. It is desirable for best yields to employ an inert solvent, such as lower alkanol, like methanol, and to keep the reaction temperature at about 30° C. until the condensation is substantially complete. The starting material is recovered by adding enough water to cause its precipitation or by distilling off the solvent, if one is used, in a vacuum. Then, if desired, purification is effected by recrystallization from a mixture of lower alcohol and water (1:1), or if the compound is a liquid, by distillation under reduced pressure.

Of course, as will be obvious to those skilled in the art, an alternative procedure is necessary to prepare compounds of Formula I, which would be derived from starting materials of Formula II wherein A is —$CH_2$— and $R_1$ is as defined above, and $R_2$ is hydrogen. This is for the reason that the said Formula II compound is difficult to obtain because the compound $H_2N$—$CH_2$—$NH_2$ is not stable enough to be isolated and used as an intermediate. One useful alternative procedure is to treat a perfluoroalkanoylamide with formaldehyde to prepare a N-methylol perfluoroalkanoylamide of Formula IV

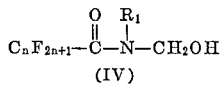

(IV)

and then to convert this to the desired product of Formula I by reaction with an appropriately substituted acrylonitrile or acrylamide and sulfuric acid, according to the following pathway:

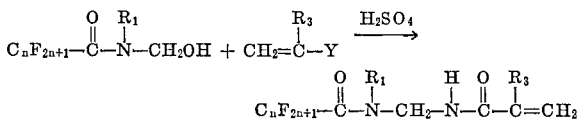

wherein Y is CN or $CONH_2$ and $R_1$ and $R_3$ are as defined above.

The acrylyl and meth-acrylyl halides of Formula III, used as starting materials, are items of commerce or can be readily prepared by treating the free acid with a slight molar excess of halogenating agent such as phosphorus tribromide, phosphorus pentachloride, and the like. The reaction mixture is allowed to stand, usually at about 25° C., until the reaction is substantially complete, then the residue is purified by recrystallization or distillation to afford the starting material of Formula III.

One convenient procedure to prepare the instant monomers is by adding the compound of Formula III to a stirred mixture of an equimolar amount of the appropriate compound of Formula II and pyridine in about one-half volume of acetonitrile, based on the reaction volume. The reaction temperature preferably is maintained at below about 30° C. Depending on the nature of the starting materials, the reaction is usually complete in about 1 hour. The product can be recovered, for example, by adding several volumes of water and then extracting it into ether, and separating the ether, the product remaining as a residue after evaporation of the ether. The product can be purified, for example, by distillation, preferably in a vacuum or by recrystallization from a solvent such as carbon tetrachloride. Polymerization during distillation can be inhibited by adding a small amount of hydroquinone.

Homopolymers and copolymers of the instant monomers are formed by standard procedures well known to those skilled in the art. Polymerization occurs readily by bulk, solution or emulsion techniques, employing free radical-forming catalysts. The ratios of percentages by weight of the respective monomers used is not particularly critical in the formation of useful copolymers. For example, charge ratios of the instant N-perfluoroalkanoylamino- and N-perfluoroalkanoylaminoalkyl-acrylates and meth-acrylates may vary from 1 to 99% by weight of the total monomer mixture. It is preferred however, for the best balance of economy and ultimate properties, to use somewhat more than 50% by weight of the instant monomers based on the total monomer mixture. Suitable techniques for preparing especially useful copolymers from the instant monomers are derived from and substantially the same as those shown in Bolstad, Sherman and Smith, U.S. 3,068,187.

Films of the homopolymers and copolymers can be prepared by casting from solvent solutions. Especially useful as solvents are fluorinated liquids, and special mention is made of α,α,α-trifluorotoluene, also known as benzotrifluoride.

It is also uniquely advantageous, especially in the preparation of fabric finishes to use blends of homopolymers of the instant monomers with other homopolymers such as polyalkylacrylates and polyalkylmethacrylates. Since the homopolymers of certain of the compounds of Formula I have a tendency to be brittle and high melting, blending them with, for example, from about 20 to about 97% by weight of a homopolymer such as poly-n-octyl methacrylate provides useful compositions which, surprisingly, retain high repellency ratings even though the relative amount of polymer of the instant monomers is quite low.

EXAMPLE I

N-pentadecafluorooctanoyl-N′-methacryloylhydrazine (a) *Pentadecafluorooctanoylhydrazide.*—To a solution of 5.0 parts of 99% hydrazine hydrate in 10 parts by volume of methanol is added dropwise with stirring 21.4 parts of methyl perfluorooctanoate. The temperature of the reaction mixture is not allowed to exceed 30° C. After the addition is complete the product is crystallized by the addition of water. After filtration, washing with methanol-water (1:1) and drying, the product, pentadecafluorooctanoylhydrazide weighs 12.8 parts and melts at 100–2° C.

*Analysis.*—Calc'd for $C_8H_3F_{15}N_2O$: C, 22.44; H, 0.70. Found: C, 22.29; H, 0.81.

(b) *N - pendadecafluorooctanoyl - N′ - methacryloylhydrazine.*—To a solution of 12.75 parts of pentadecafluorooctanoylhydrazide and 2.4 parts of pyridine in 10 parts by volume of acetonitrile is added, dropwise with stirring, 3.57 parts of methacrylyl chloride. The temperature is not allowed to exceed 30° C. Stirring is continued for 45 minutes, after which an equal volume of water is added to the reaction mixture causing the separation of a heavy oil. The water-acetonitrile layer is decanted and benzene is added causing the oil to crystallize. The solid is removed by filtration, air dried and recrystallized from carbon tetrachloride to yield 7.7 parts of N-pentadecafluorooctanoyl-N′-methacryloylhydrazine melting at 111.5–113.5° C.

*Analysis.*—Calc'd for $C_{12}H_7F_{15}N_2O_2$: C, 29.04; H, 1.42. Found: C, 29.23; H, 1.41.

EXAMPLE II

N-pentadecafluorooctanoyl-N′-methacryloylpiperazine (a) *N-pentadecafluorooctanoylpiperazine.*—To a solution of 8.6 parts of anhydrous piperazine in 10 parts by volume of methanol is added, dropwise with stirring, 21.4 parts of methyl perfluorooctanoate. The reaction is exothermic to 29° and a heavy white precipitate separates. The precipitate is separated by filtration and shown by analysis to be N,N′-bis(pentadecafluorooctanoyl)piperazine, M.P. 149–151°. The filtrate is then taken to dryness by means of a rotary vacuum evaporator and the residue dissolved in 50 parts by volume of hot benzene. On cooling, 4.4 parts of a white precipitate is separated which is shown by analyses ot be the di-pentadecafluorooctanoic acid salt of piperazine, M.P. 248° dec. The filtrate is again taken to dryness by means of a rotary vacuum evaporator and the residue vacuum distilled. A fraction (3.75 parts) boiling at 107–8°/0.16 mm. is obtained which is shown by analysis to be the desired N-pentadecafluorooctanoylpiperazine.

(b) *N - pentadecafluorooctanoyl - N′ - methacryloylpiperazine.*—To a cooled solution of 3.0 parts of N-pentadecafluorooctanoylpiperazine and 0.88 parts of triethylamine in 5 parts by volume of aetconitrile is added, dropwise with mixing, 0.90 parts of methacrylyl chloride. After standing for 1 hour at room temperature, 5 parts by volume of water is added to the reaction mixture causing the separation of an oil. The upper water layer is decanted and the oil washed two times with water whereupon the oil solidifies. The product is then filtered, dried and recrystallized from hot heptane. In this manner 1.9 parts of N-pentadecafluorooctanoyl-N'-methacryloylpiperazine, melting at 74–7°, is obtained.

*Analysis.*—Calc'd for $C_{16}H_{13}F_{15}N_2O_2$: C, 34.92; H, 2.38. Found: C, 34.92; H, 2.45.

EXAMPLE III

N-pentadecafluorooctanoyl-N'-methyl-N'-methacryloylhydrazine (a) *N-pentadecafluorooctanoyl-N'-methylhydrazide.*—By the procedure of Example I(a), substituting an equimolar amount of methylhydrazine for the hydrazine hydrate, a crude solid product is isolated, which after drying, is purified by vacuum distillation. In this manner 16.6 parts of product boiling at 105–7°/2.4 mm. is obtained. The infrared spectrum shows the structure of this product to be N-pentadecafluorooctanoyl-N'-methylhydrazide, rather than the other possible isomer, N-pentadecafluorooctanoyl-N-methylhydrazide.

*Analysis.*—Calc'd for $C_9H_5F_{15}N_2O$: C, 24.45; H, 1.14. Found: C, 24.34; H, 0.86.

(b) By the procedure of Example I(b), substituting equimolar amounts of N-pentadecafluorooctanoyl-N-methylhydrazide for pentadecafluorooctanoylhydrazide and triethylamine for pyridine, there is obtained a liquid product which is vacuum distilled to yield 7.2 parts of N-pentadecafluorooctanoyl-N'-methyl-N'-methacryloylhydrazine boiling at 147–150°/0.250 mm.

*Analysis.*—Calc'd for $C_{13}H_9F_{15}N_2O_2$: C, 30.60; H, 1.77. Found: C, 30.90; H, 1.90.

EXAMPLE IV

N-perfluorooctanoyl-N'-acryloylhydrazine

To a 100 ml. flask containing 6.7 parts of perfluorooctanoylhydrazide (Example 1(a)) and 1.74 parts of triethylamine in 40 parts by volume of acetonitrile is added dropwise with stirring 1.55 parts of acryloyl chloride. The temperature is kept between 20° C. and 28.5° C. by cooling. After the addition, stirring is continued for 2 hours at room temperature after which the reaction mixture is poured into water and the precipitated product separated by filtration, washed with water and dried to constant weight. The product is recrystallized from chloroform and then sublimed at 115° C. and 0.010 mm. pressure. In this manner 2.6 parts of N-perfluorooctanoyl-N'-acryloylhydrazine which melts at 115–116° C. is obtained. The structure of the product is confirmed by IR and NMR.

EXAMPLE V

N-perfluorooctanoyl-N'-methyl-N'-acryoylhydrazine

To a 200 ml. flask containing 23.6 parts of N-perfluorooctanoyl-N'-methylhydrazide and 5.93 parts of triethylamine in 50 parts by volume of acetonitrile is added dropwise with stirring 5.28 parts of acryloyl chloride. The addition is carried out in 30 minutes and the temperature is not allowed to go above 30° C. After stirring at room temperature for 3 hours, the reaction mixture is poured into water. The oily layer is extracted into 1,1,2-trichloro-1,2,2-trifluoroethane, washed several times with water, dried and the solvent removed under reduced pressure. The viscous oil remaining is then distilled at reduced pressure whereupon 5.76 parts of N-perfluorooctanoyl-N'-methyl-N'-acryoylhyrazine boiling at 126.5–138° C. at 0.005 mm. pressure is obtained. The structure of the product is confirmed by IR and NMR.

EXAMPLE VI

N-perfluorooctanoyl-N,N'-dimethyl-N'-methacryloylhydrazine (a) *N - perfluorooctanoyl - N,N'-dimethylhydrazide.*—To a mixture of 10.0 parts sym-dimethylhydrazine dihydrochloride in 50 parts by volume of methanol is added 15.2 parts of triethylamine and 16.1 parts of methyl perfluorooctanoate and the reaction mixture is refluxed for 2 hours. The reaction mixture is then poured into water and the oily layer is extracted into ether. The ether extract is washed several times with water, dried and the ether removed under reduced pressure. The residue is distilled under reduced pressure to yield 5.8 parts of N-perfluorooctanoyl-N,N'-dimethylhydrazide boiling at 85–7° C. at 0.200 mm. pressure.

*Analysis.*—Calc'd for $C_{10}H_7F_{15}N_2O$: C, 26.33; H, 1.54; F, 62.48. Found: C, 26.47; H, 1.35; F, 62.61.

(b) *N - perfluorooctanoyl-N,N'-dimethyl-N'-methacryloylhydrazine.*—To a mixture of 5.8 parts of N-perfluorooctanoyl-N,N'-dimethylhydrazide and 1.53 parts of triethylamine in 20 parts by volume of acetonitrile is added 1.58 parts of methacryloyl chloride dropwise with stirring in 20 minutes, keeping the reaction temperature below 30° C. The reaction mixture is allowed to stand at room temperature for about 48 hours and then poured into water. The oily layer is extracted into methylene chloride, washed several times with water, dried and the solvent removed under reduced pressure. The residue is distilled at 0.4 mm. pressure to give 2.7 parts of N-perfluorooctanoyl-N,N'-dimethyl-N'-methacryloylhydrazine boiling at 128–134.5° C. The structure is confirmed by IR and NMR.

EXAMPLE VII

By the procedure of Example I, substituting stoichiometrically equivalent amounts of appropriately substituted N-amino- and N-aminoalkyl perfluoroalkaloylamides and acrylyl halides, there are obtained the following new compounds of this invention:

$$\underset{C_nF_{2n+1}}{}-\overset{O}{\underset{\|}{C}}-\overset{R_1}{\underset{|}{N}}-A-\overset{R_2}{\underset{|}{N}}-\overset{O}{\underset{\|}{C}}-\overset{R_3}{\underset{|}{C}}=CH_2$$

| $C_nF_{2n1}$ | A | $R_1$ | $R_2$ | $R_3$ |
|---|---|---|---|---|
| $CF_3$ | | H | H | $CH_3$ |
| $(CF_3)_2CF$ | | $CH_3$ | H | H |
| $CF_3(CF_2)_6$ | $-(CH_2)_4-$ | H | $(CH_3)_2CH$ | $CH_3$ |
| $CF_3(CF_2)_{10}$ | $-(CH_2)_2-$ | | $-(CH_2)_2-$ | $CH_3$ |
| $CF_3(CF_2)_{17}$ | | H | $CH_3$ | H |
| $CF_3(CF_2)_6$ | | $(CH_3)_3C$ | $(CH_3)_3C$ | $CH_3$ |
| $CF_3(CF_2)_{10}$ | | $CH_3(CH_2)_5$ | $CH_3(CH_2)_5$ | $CH_3$ |
| $CF_3(CF_2)_{10}$ | $-(CH_2)_2-$ | $CH_3CH_2$ | $CH_3CH_2$ | H |
| $CF_3(CF_2)_6$ | | $CH_3$ | $CH_3$ | H |
| $(CF_3)_2CFCF_2)_6$ | | H | H | $CH_3$ |
| $(CF_3)_2CF[CF_2CF(CF_3)]_4$ | | H | H | $CH_3$ |
| $CF_3[CF_2CF(CF_3)]_5$ | | H | H | $CH_3$ |

These monomers can be homopolymerized or copolymerized to provide products with strongly hydrophobic and oleophobic properties.

What is claimed is:

1. A compound of the formula.

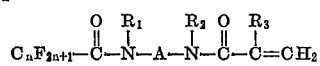

wherein:

$n$ is a whole number of from 1 to 18;
A is $-(CH_2)_m-$, $m$ being from 0 to 4;
$R_1$ and $R_2$, independently, are each hydrogen or alkyl of from 1 to 6 carbon atoms; or when taken together $R_1$ and $R_2$ are $-CH_2CH_2-$ when A is $-CH_2CH_2-$; and $R_3$ is hydrogen or methyl.

2. A compound as defined in claim 1 wherein $n$ is 7, $m$ is 0, $R_1$ and $R_2$ are hydrogen and $R_3$ is methyl.

3. A compound as defined in claim 1 wherein $n$ is 7, $m$ is 2, $R_1$ and $R_2$, taken together, and A are $-CH_2CH_2-$ and $R_3$ is methyl.

4. A compound as defined in claim 1 wherein $n$ is 7, $R_1$ is hydrogen, $m$ is 0, and $R_2$ and $R_3$ are methyl.

5. A compound as defined in claim 1 wherein $n$ is 7, $m$ is 0, and $R_1$, $R_2$ and $R_3$ are hydrogen.

6. A compound as defined in claim 1 wherein $n$ is 7, $m$ is 0, $R_1$ $R_3$ are hydrogen and $R_2$ is methyl.

7. A compound as defined in claim 1 wherein $n$ is 7, $m$ is 0 and $R_1$, $R_2$ and $R_3$ are methyl.

References Cited

UNITED STATES PATENTS 3,134,810   5/1964   Tomcufcik et al. _____ 260—561

ALEX MAZEL, Primary Examiner

A. M. T. TIGHE, Assistant Examiner

U.S. Cl. X.R.

106—2; 252—8.8; 260—404.5, 561